H. F. McKERVEY.
CAR-COUPLING.
No. 169,563.  Patented Nov. 2, 1875.
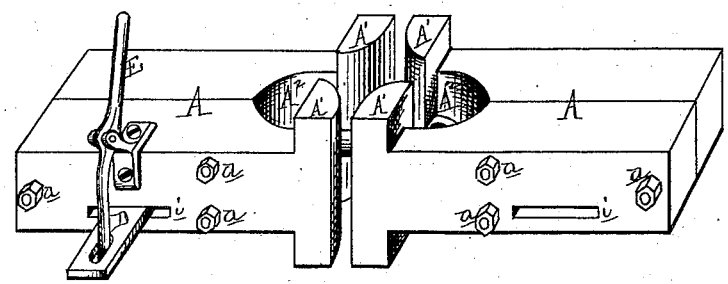
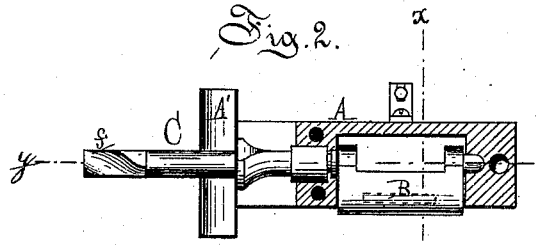
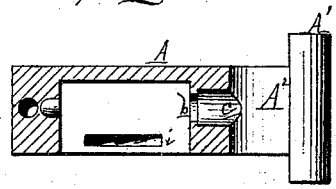
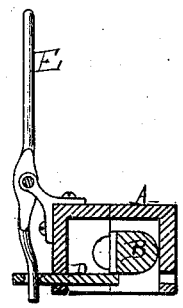
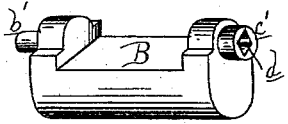
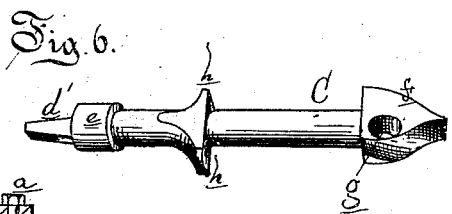
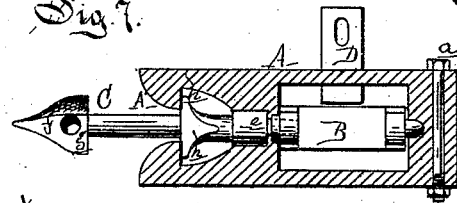
Attest:
Edward Barthel
W. P. Holding
Inventor:
H. F. McKervey
By Atty
Thos. S. Sprague

UNITED STATES PATENT OFFICE.

HUGH F. McKERVEY, OF CHEBOYGAN, MICHIGAN, ASSIGNOR TO HIMSELF, ANGUS McKAY, AND CHARLES S. RAMSAY, OF SAME PLACE.

IMPROVEMENT IN CAR-COUPLINGS.

Specification forming part of Letters Patent No. 169,563, dated November 2, 1875; application filed May 4, 1875.

*To all whom it may concern:*

Be it known that I, HUGH F. McKERVEY, of Cheboygan, in the county of Cheboygan and State of Michigan, have invented an Improvement in Car-Couplings, of which the following is a specification:

The invention is an improvement in car-couplings of the harpoon variety; and it relates, first, to the construction and arrangement whereby the coupling-bar is connected with a pivoted counter-weight, and by it maintained in such position that lateral arms or shoulders formed on its middle portion will remain engaged with hooks or shoulders formed on the front end of the same draw-head which contains the counter-weight. The invention consists, secondly, in the arrangement of a sliding bar in such relation to the counter-weight, pivoted within the chamber of the draw-head, that the latter may be thereby raised or turned on its pivots and locked or held in its elevated position by the slide-bar projecting under it, as hereinafter described.

Figure 1 is a perspective view of a pair of draw-heads coupled. Fig. 2 is an elevation of the inner face of one-half a draw-head, with the harpoon and weight in position. Fig. 3 is a similar elevation of the other half without the harpoon. Fig. 4 is a cross-section at *x x*. Fig. 5 is a detached perspective view of the counter-weight. Fig. 6 is a similar view of the harpoon. Fig. 7 is a horizontal section at *y y*.

In the drawing, A represents the draw-head, which is made in two equal parts, placed side by side, and secured together by bolts *a*, passing transversely through them. The front end of each half of the draw-head is shaped to form a hook, $A^1$, with a space between the inner ends or barbs of the hooks, behind which there is an enlarged recess, open at top and bottom. The hooks project above and below the top and bottom planes of the draw-head, and form the buffers thereof. In the body of each half of the draw-head there is formed a recess, $A^2$, with a step, *b*, at the rear end, and a bearing, *c*, at the front end, leading through to the cavity behind the hooks. B is a counter-weight, having a trunnion, *b'*, at the rear end, and another one, *c'*, at the front end, which trunnions are laid in the bearings *b c* before the halves of the draw-head are bolted together. In the front end of the trunnion *c'* there is a square socket, *d*, which receives a shank, *d'*, at the rear end of a harpoon, C, having a shoulder, *e*, next said shank, which is journaled in the fore part of the bearing *c*, which is enlarged to receive it. The enlargement of said bearing forms a shoulder, which receives the backward thrust of the harpoon. The harpoon has a flat head, *f*, whose edges are spirally beveled, and there is also a pin-hole, *g*, through it. In front of the shoulder *e* two flat-sided arms, *h*, are forged on it. The shank *d'* is inserted in the socket of the counter-weight, so that the arms *h h* will lie horizontally and be arrested by the hooks, while the harpoon-head, when engaged with an opposing draw-head, will take the draft of the latter. The counter-weight, being hung eccentrically, will normally keep the harpoon in the position described, and, on its entering between two hooks of an approaching draw-head, the spiral head will give it an axial quarter-turn, throwing up the weight to a horizontal plane with its trunnions, until the harpoon has passed behind the hooks, when the weight will turn the harpoon to its normal position again.

The pin-hole is designed to couple the harpoon with an ordinary draw-head.

The harpoon can be detached by giving it and the weight a quarter-turn and withdrawing it.

To uncouple, a slot, *i*, is made in the side of the lower part of the draw-head, in which a plate, D, is inserted, which plate may be operated by any suitable lever, E, either on the side of the draw-head or side of the car, by pushing it in against the lower part of the counter-weight, which it turns on its trunnions to the uncoupling position.

The vertically-elongated hooks enable cars of different heights to be coupled, while the draft is always in a direct line.

What I claim as my invention is—

1. The combination, with the draw-head A, having hooks A' and bearing *c*, of the end-pivoted trunnioned counter-weight B, with socket *d*, and the harpoon coupling-bar C, provided with shank $d'$, lateral arms $h\ h$, and flat head $f$, all as shown and described, to operate as specified.

2. In combination with the coupling-bar C, constructed as described, and the end-pivoted swinging counter-weight B, arranged within the chamber of the draw-head, the horizontal slotted slide D and vertical lever E, for raising said counter-weight and holding it in an elevated position, as shown and described, for the purpose specified.

HUGH F. McKERVEY.

Witnesses:
 OLIVER SPOONER,
 GEORGE WILSON.